May 11, 1926. 1,584,211
R. T. A. BURKE
SHOCK ABSORBING AND SNUBBING DEVICE
Filed June 2, 1924  3 Sheets-Sheet 1
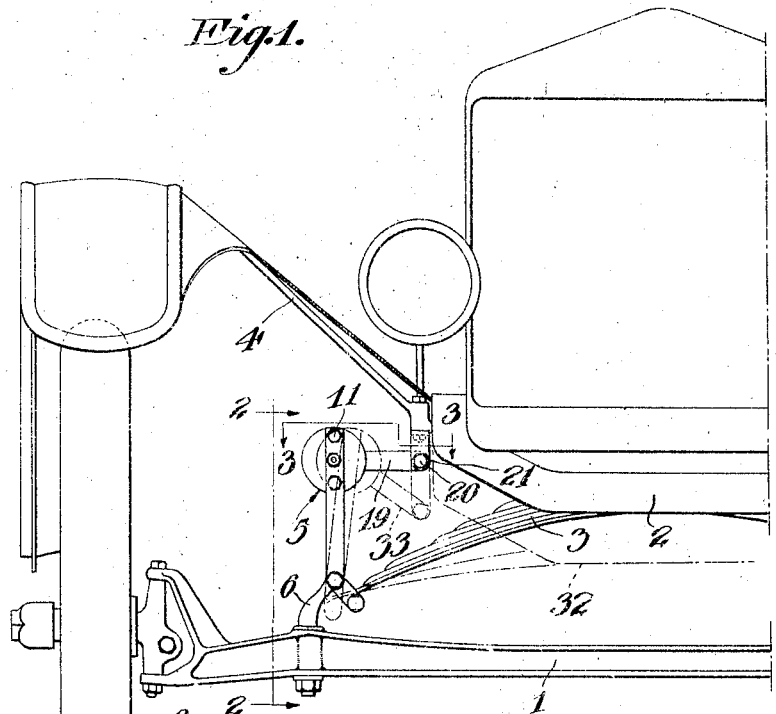
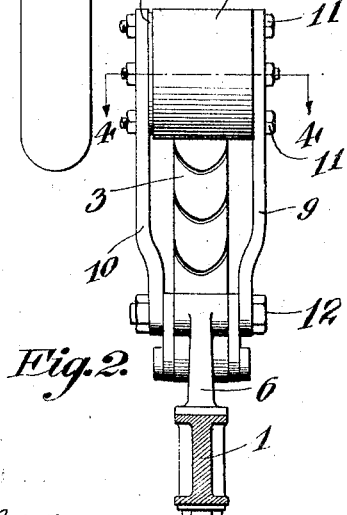
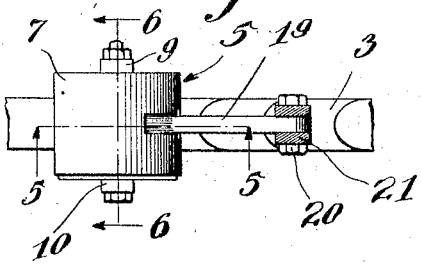
Inventor
Richard T. A. Burke May 11, 1926.
R. T. A. BURKE
1,584,211
SHOCK ABSORBING AND SNUBBING DEVICE
Filed June 2, 1924     3 Sheets-Sheet 2
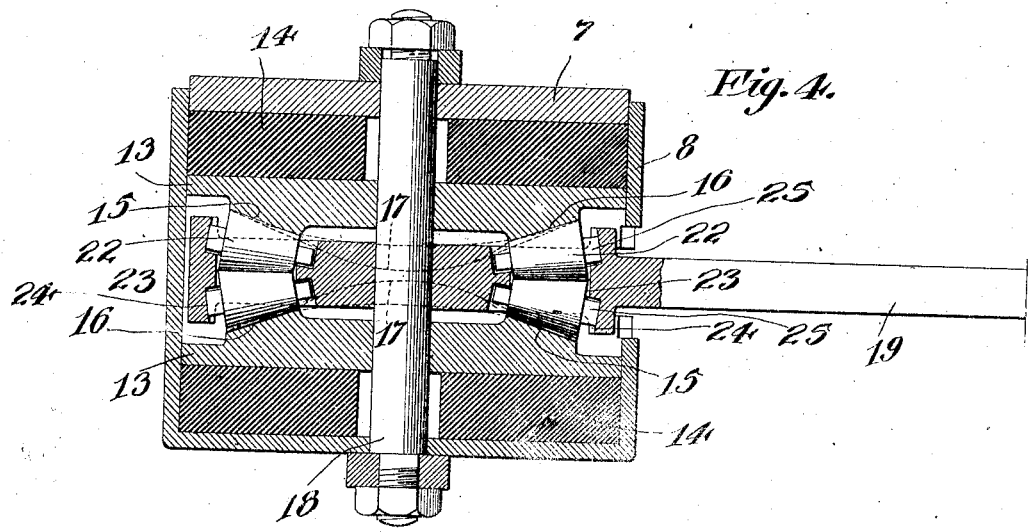
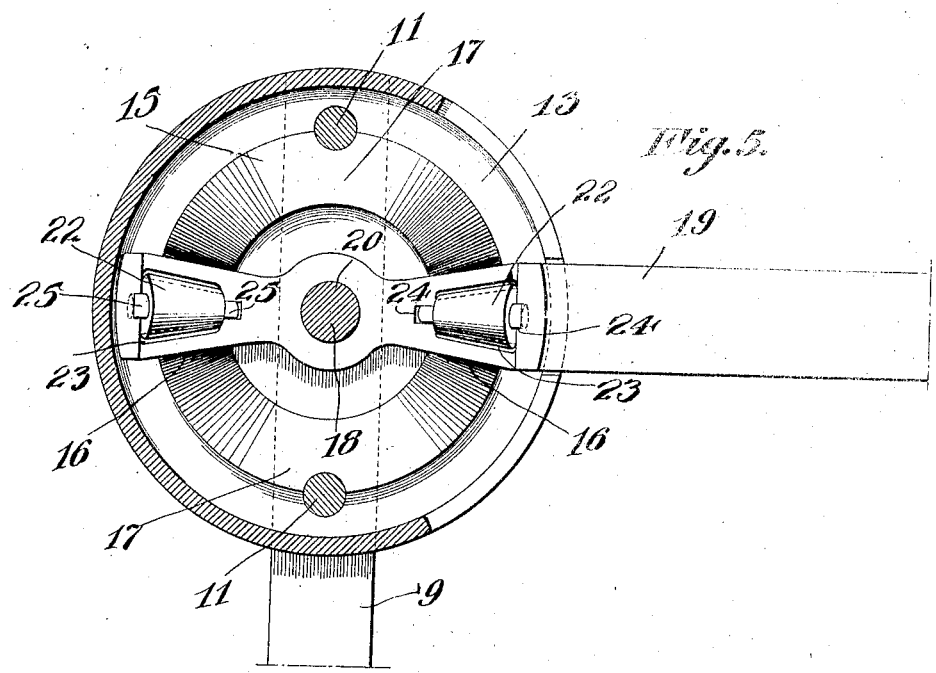
Witnesses
Virgil L. Mares
George A. Gruse
Inventor
Richard T. A. Burke
By Joshua R. H. Potts
His Attorney May 11, 1926.

R. T. A. BURKE 1,584,211

SHOCK ABSORBING AND SNUBBING DEVICE

Filed June 2, 1924     3 Sheets-Sheet 3

Witnesses:

Inventor
Richard T. A. Burke
By Joshua R. H. Potts
His Attorney

Patented May 11, 1926.

1,584,211

UNITED STATES PATENT OFFICE.

RICHARD T. A. BURKE, OF BRIDGETON, NEW JERSEY.

SHOCK ABSORBING AND SNUBBING DEVICE.

Application filed June 2, 1924. Serial No. 717,239.

My invention relates to shock absorbing and snubbing devices adapted for use on automobiles.

Automobiles are provided with springs of sufficient stiffness to withstand heavy shocks. Light shocks are not absorbed by these stiff springs, but are transmitted to the body of the automobile, and the rebound caused by the heavy shocks is of such magnitude that the body is thrown upward. This stiff characteristic of springs is well recognized as detrimental to comfortable riding.

With the motor running vibratory motion is imparted to the body of the car whether the car is occupied or unoccupied. These vibrations cause continuous vibration or oscillation of the wheel. This vibration of the wheel is exceedingly tiresome to the driver of the car and the vibration of the body, and especially of the floor, is tiresome not only to the driver but to other occupants of the car. In addition to the vibratory movement, car bodies, especially in cars of the type in which the springs are in line with the axle, are liable to heavy sidewise sways such as occur when rounding a curve, and the springs often break.

In some cases the connection between the axle and the chassis is too resilient vertically and in other cases it is too resilient laterally.

The objects of my invention are to provide means for connecting the chassis with the axle which will not only eliminate the objectionable vibrations but will absorb to the maximum both heavy and light shocks, and reduce side-wise sways to the minimum, and which may be readily applied to the types of automobiles now in use.

These objects, and other advantageous ends which will be described hereinafter, I attain in the following manner, reference being had to the accompanying drawings in which—

Figure 6:
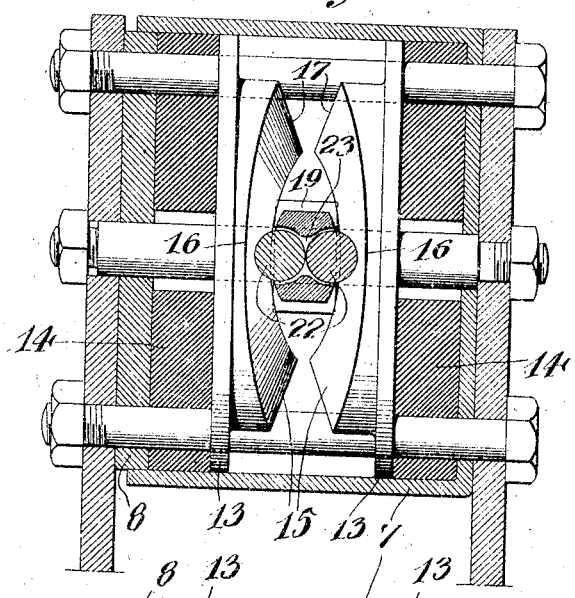
Figure 8:
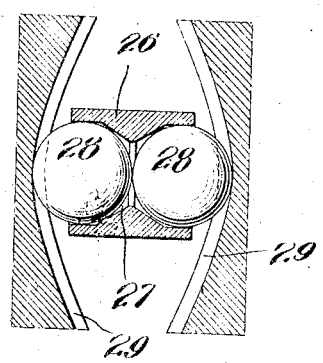
Figure 7:
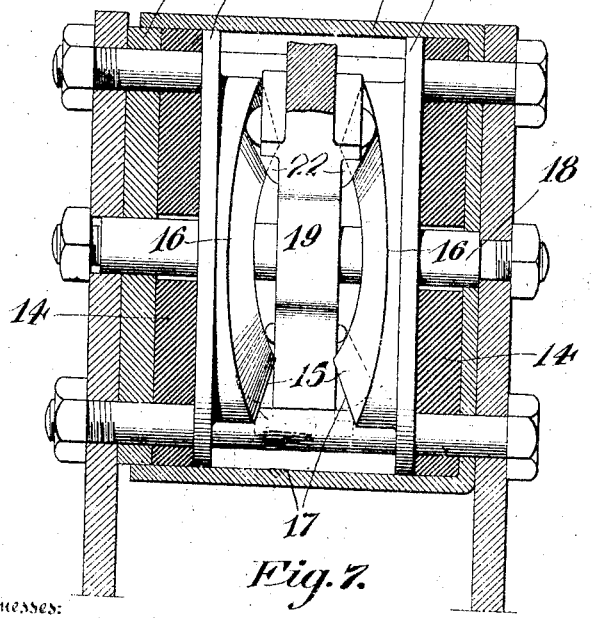
Figure 9:
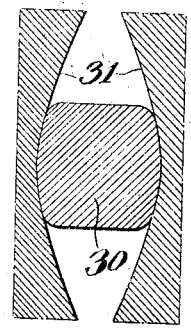

Figure 1 is a fragmentary front elevation of an automobile having my invention applied thereto, Figure 2 an enlarged fragmentary section on line 2—2 of Figure 1, Figure 3 an enlarged fragmentary section on line 3—3 of Figure 1, Figure 4 an enlarged section on line 4—4 of Figure 2, Figure 5 an enlarged section on line 5—5 of Figure 3, Figure 6 an enlarged section on line 6—6 of Figure 3, Figure 7 a view similar to Figure 6 illustrating the parts moved into another position, Figure 8 a fragmentary section of Figure 6 illustrating a modified form, and Figure 9 a fragmentary section similar to Figure 8 illustrating another form.

Referring to the drawings, 1 indicates the axle of an automobile, 2 the chassis, 3 the spring connecting the axle with the chassis and 4 the fender supporting rod secured to the chassis. My shock absorbing and snubbing device 5 is connected with the chassis and the axle and retards any considerable movement in any direction, of the chassis relatively to the axle, but has little effect upon slight movement. In the present instance, I have shown the device 5 connected with the axle through the perch 6, and to the chassis through the fender supporting rod 4.

Device 5 has a cylindrical casing made in sections 7 and 8 which are adjustable lengthwise. Yoke arms 9 and 10 are secured to the sections by a pair of guide bolts 11 extending from one section to the other. These yoke arms are pivoted at 12 to perch 6 in any suitable manner. A pair of compressing plates 13 are slidably mounted on the guides to move lengthwise of the cylindrical casing. Resilient disks 14, preferably of rubber, are placed between each plate 13 and each end of the cylindrical casing. Plates 13 are adapted to compress resilient disks 14, when retarding the movement of the chassis relatively to the axle. Each plate 13 is provided with an arcuate inclined camming face 15 having its lowest point at 16 and its highest point at 17. A shaft 18 is secured to the casing preferably by passing its ends through each section and each of the yoke arms 9 and 10, and fastening the shaft thereto by nuts or otherwise. The shaft is disposed concentrically to the arcuate inclined faces 15. An arm 19 is pivoted adjacent one of its ends on the shaft and has its other end pivoted at 20 to a U-shaped bracket 21 fixed to fender support 4. Arm 19 is disposed between the camming faces and when swung in either direction, functions with the inclined camming faces 15 to separate the plates 13 and compress the resilient disks 14 at right angles to the swinging direction. The parts of the arm which co-operate with the inclined faces are disposed diametrically opposite the shaft and are provided with anti-friction means, preferably of the roller type, which include pairs of conical rollers 22 disposed in apertures 23 having sockets 24 in which roller trunnions 25 bear. Each roller of a pair engages the other and the adjacent inclined face. As the rollers are moved between the inclined faces by the swinging movement of arm 19, they roll on the inclined faces and on each other and force plates 13 at right angles to the swinging direction of the arm to compress disks 14.

In Figure 8, I have shown a modified form of anti-friction means for arm 19 consisting of an arm 26 having an aperture 27 in which a pair of balls 28 are disposed. These balls roll on each other and on races 29 which are inclined to correspond with the inclination of camming faces 15.

In Figure 9, I have shown another form in which an arm 30 corresponding to arm 19 directly engages inclined faces 31 which correspond to the faces 15. In this form the anti-friction means are eliminated.

In use, when the axle is moved by a shock relatively to the chassis in any direction, for example in the downward direction as shown in dot-and-dash lines at 32, arm 19 will be moved relatively to yoke arms 9 and 10 as shown in dot-and-dash lines at 33. If the chassis is moved upwardly the arm will move upwardly as shown in Figure 7. If the chassis is moved sidewise in either direction the arm will move either upwardly or downwardly. In any case a movement of the chassis relatively to the axle will move arm 19 relatively to yoke arms 9 and 10. Such movement of arm 19 causes rollers 22 to ride between the inclined faces 15 from the low point 16 toward the high point 17. This action forces plates 13 against resilient disks 14 to compress them. The compressing action retards the movement of arm 19 and the chassis to which the arm is pivoted. After the movement of the chassis is retarded and the arm moved to its normal position, resilient disks 14 will expand and move compressing plates 13 to their normal position as shown in Figure 6.

When arm 19 is adjacent low points 16 on the inclined camming faces, a slight movement of the arm is practically uneffected by the inclined faces 15. Light shocks which move arm 19 slightly are practically absorbed by the light resilient spring, while the heavy shocks which move arm 19 to a greater extent are absorbed by the compressing action of disks 14, thereby preventing breakage of the spring and yet permitting the use of a light resilient spring such as is required for easy and comfortable riding.

With this device applied to a car there is no perceptible vibration of either steering wheel or floor when the car is on the road.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with the axle and chassis of a vehicle, a casing connected with the axle; compressing members movable in the casing; resilient means between each compressing member and the casing, and movable means, between the compressing members, connected with the chassis and adapted to move the members against the action of the resilient means as the chassis moves relatively to the axle.

2. In combination with the axle and chassis of a vehicle, a casing connected with the axle; compressing members movable in the casing; resilient means between each compressing member and the casing, and anti-friction movable means, between the compressing members, connected with the chassis and adapted to move the members against the action of the resilient means as the chassis moves relatively to the axle.

3. In combination with the axle and chassis of a vehicle, a casing connected with the axle; compressing members movable in the casing; resilient means between each compressing member and the casing; an arm pivoted in the casing between the compressing members and connected with the chassis, and means carried by the arm adapted to move the compressing members against the action of the resilient means as the chassis moves relatively to the axle.

4. In combination with the axle and chassis of a vehicle, a casing connected with the axle; compressing members movable in the casing; resilient means between each compressing member and the casing; an arm pivoted in the casing and connected with the chassis, and rolling members, carried by the arm engaging the compressing members and adapted to move them against the action of the resilient means as the chassis moves relatively to the axle.

5. In combination with the axle and chassis of a vehicle, a casing connected with the axle; compressing members movable in the casing; resilient disks between each compressing member and the casing; a shaft secured to the casing and connecting the disks and the compressing members; an arm pivoted on the shaft between the compressing members and connected with the chassis, and means carried by the arm engaging the compressing members and adapted to move them against the action of the resilient means as the chassis moves relatively to the axle.

6. In combination with the axle and chassis of a vehicle, a casing; compressing members movable in the casing; resilient means between the compressing members and the casing; arms pivotally connecting the casing with an axle perch; a pivot shaft in the casing connecting the resilient means and the compressing members; an arm pivoted to the shaft between the compressing members, and pivotally connected with the chassis, and means carried by the arm adapted to engage the compressing members and move them against the resistance of the resilient means as the chassis moves relatively to the axle.

7. In combination with the axle and chassis of a vehicle, a casing; compressing members movable in the casing; resilient means between the compressing members and the casing; arms pivotally connecting the casing with an axle perch; a pivot shaft in the casing connecting the resilient means and the compressing members; an arm pivoted to the shaft between the compressing members, and pivotally connected with the chassis, and anti-friction means carried by the arm adapted to engage the compressing members and move them against the resistance of the resilient means as the chassis moves relatively to the axle.

8. In combination with the axle and chassis of a vehicle, a casing connected with the axle; guides secured in the casing; compressing members movable on the guides; resilient means between the compressing member and the casing, and movable means between the compressing members, connected with the chassis and adapted to move the members against the action of the resilient means as the chassis moves relatively to the axle.

9. In combination with the axle and chassis of a vehicle, a casing connected with the axle; compressing members movable in the casing and having opposed inclined faces, and movable means, between the compressing members, connected with the chassis and adapted to engage the inclined faces and move the members against the action of the resilient means as the chassis moves relatively to the axle.

10. In combination with the axle and chassis of a vehicle, a casing connected with the axle; compressing members movable in the casing and having opposed arcuate inclined faces; an arm pivoted between the faces and connected with the chassis, and anti-friction means, carried by the arm, engaging the inclined faces and adapted to move the compressing members against the action of the resilient means as the chassis moves relatively to the axle.

11. In combination with the axle and chassis of a vehicle, a casing connected with the axle; guides secured in the casing; compressing members slidable on the guides; resilient means between each compressing member and the casing; a shaft secured to the casing; an arm pivoted on the shaft between the compressing members and connected with the chassis, and anti-friction means, carried by the arm, engaging the compressing members and adapted to move them against the action of the resilient means as the chassis moves relatively to the axle.

12. In combination with the axle and chassis of a vehicle, a casing connected with the axle; compressing plates movable in the casing; resilient disks between each plate and the casing, and movable means, between the plates, connected with the chassis and adapted to move the plates against the action of the disks as the chassis moves relatively to the axle.

13. In combination with the axle and chassis of a vehicle, a casing connected with the axle; compressing plates movable in the casing; rubber disks between each plate and the casing, and movable means, between the plates, connected with the chassis and adapted to move the plates against the action of the disks as the chassis moves relatively to the axle.

14. In combination with the axle and chassis of a vehicle, a cylindrical casing connected with the axle; guides mounted in the casing lengthwise thereof; compressing plates slidable on the guides; resilient disks between each guide and the end of the casing; a shaft fixed to the casing lengthwise thereof; an arm pivoted on the shaft and pivotally connected with the chassis, and anti-friction means on the arm, at opposite sides of the shaft, engaging the plates and adapted to move them against the action of the disks as the chassis moves relatively to the axle.

15. In combination with the axle and chassis of a vehicle, a sectional casing connected with the axle and adjustable lengthwise; guides secured to the casing to permit adjustment thereof; compressing plates slidable on the guides; resilient disks between each plate and each end of the casing; a shaft secured lengthwise of the casing; an arm pivoted on the shaft between the plates and connected with the chassis, and means carried by the arm, engaging the plates and adapted to move them against the action of the disk as the chassis moves relatively to the axle.

16. In combination with the axle and chassis of a vehicle, a casing connected with the axle; guides secured within the casing; compressing plates slidable on the guides and having arcuate inclined faces; a shaft secured to the casing and disposed concentrically to the faces; an arm pivoted on the shaft between the faces and connected with the chassis, and anti-friction means on the arm at opposite sides of the shaft, engaging the faces and adapted to move the plates against the action of the disks as the chassis moves relatively to the axle.

In testimony whereof I have signed my name to this specification.

RICHARD T. A. BURKE.